UNITED STATES PATENT OFFICE.

JUDIE D. LIPSCOMB, OF ANDREWS, VIRGINIA.

IMPROVEMENT IN REMEDY FOR FEVERS.

Specification forming part of Letters Patent No. 186,141, dated January 9, 1877; application filed June 16, 1876.

*To all whom it may concern:*

Be it known that I, Miss JUDIE D. LIPSCOMB, of Andrews, in the county of Spottsylvania and State of Virginia, have invented a new and Improved Medical Compound; and I do hereby declare that the following is a full, clear, and exact description of the same.

The object of my invention is the compounding of a medicine to act as a specific in the treatment of remittent and intermittent fevers, and all other malarial diseases.

The mode of preparing my invention is as follows: Take one-half ounce each of the following articles (preferably in powder:) tulip-tree bark, (*Liriodendron,*) willow bark, (*Salix,*) blue gentian, (*Gentiana catesbæi,*) wild-cherry bark, (*Prunus Virginiana,*) dogwood bark, (*Cornus Florida,*) sassafras, (*Sassafras,*) and flowering almond (*Prunus amygdalus.*)

Of these make a strong infusion in one pint of cold water, and add an equal quantity of whisky. Then add as much common salt as the mixture will dissolve, and to the whole add twenty-five grains of sulphate of quinia, and one-half a fluid ounce of Fowler's solution of arsenic (*Liquor potassæ arsenitis.*)

Having thus described my invention, and its mode of preparation, what I claim is—

The above-described compound, consisting of tulip-tree bark, (*Liriodendron,*) willow bark, (*Salix,*) blue gentian, (*Gentiana catesbæi,*) wild-cherry bark, (*Prunus Virginiana,*) dogwood bark, (*Cornus Florida,*) sassafras, (*Sassafras,*) flowering almond, (*Prunus amygdalus,*) whisky, common salt, sulphate of quinia, and Fowler's solution of arsenic, (*Liquor potassæ arsenitis,*) in or about the proportions specified.

MISS JUDIE D. LIPSCOMB.

Witnesses:
H. A. CAMMACK,
C. A. CARNES.